(12) United States Patent
Tan et al.

(10) Patent No.: US 10,897,404 B2
(45) Date of Patent: *Jan. 19, 2021

(54) SYSTEM AND METHOD OF A MANIPULATIVE HANDLE IN AN INTERACTIVE MOBILE USER INTERFACE

(71) Applicant: Box Inc., Redwood City, CA (US)

(72) Inventors: Simon Tan, Daly City, CA (US); Nick Terry, Los Altos, CA (US); Rico Yao, San Jose, CA (US); Don Cung, Palo Alto, CA (US)

(73) Assignee: Box, Inc., Redwood City, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/227,188

(22) Filed: Dec. 20, 2018

(65) Prior Publication Data
US 2019/0149431 A1 May 16, 2019

Related U.S. Application Data

(63) Continuation of application No. 13/737,577, filed on Jan. 9, 2013, now Pat. No. 10,200,256.

(60) Provisional application No. 61/701,823, filed on Sep. 17, 2012.

(51) Int. Cl.
*H04L 12/24* (2006.01)
*H04W 4/60* (2018.01)
*H04W 4/02* (2018.01)
*H04W 4/21* (2018.01)

(52) U.S. Cl.
CPC ............. *H04L 41/22* (2013.01); *H04W 4/023* (2013.01); *H04W 4/60* (2018.02); *H04W 4/21* (2018.02)

(58) Field of Classification Search
CPC ....... H04W 4/60; H04W 12/24; H04W 4/023; H04W 4/21; H04L 41/22
See application file for complete search history.

*Primary Examiner* — Pei Yong Weng
(74) *Attorney, Agent, or Firm* — Sheridan Ross P.C.

(57) ABSTRACT

System and method of a manipulative handle for revealing detail information in an interactive mobile user interface are disclosed. In one embodiment, when an activity supported by a cloud-based (e.g., online cloud-based collaboration platform) is initiated, the status of the activity is tracked and displayed using an animated user interface element. On and/or near the animated user interface element are hidden grab points that can be engaged to expand the user interface element to reveal detail relating to the activity. If the user interface element is already in an expanded state, detecting activation of hidden grab points on and/or near the user interface element causes minimization of the user interface element, thereby concealing the detail revealed earlier.

20 Claims, 10 Drawing Sheets

SYSTEM AND METHOD OF A MANIPULATIVE HANDLE IN AN INTERACTIVE MOBILE USER INTERFACE

CROSS-REFERENCE TO RELATED APPLICATIONS

The present application is a continuation of U.S. patent application Ser. No. 13/737,577 entitled "System and Method of a Manipulative Handle in an Interactive User Interface", filed on Jan. 9, 2013 which claims priority to and benefit from U.S. Provisional Patent Application Ser. No. 61/701,823 entitled "Use of a Status Bar Interface Element as a Handle for Revealing Additional Details", filed on Sep. 17, 2012, of which the entire content of each is expressly incorporated by reference herein.

BACKGROUND

A mobile device generally has a limited display area. An application running on the mobile device can display limited information at a time. Some applications minimize fonts, button sizes, etc., in order to fit more information on a display screen. Others cramp the display area by making more information visible at a time. Yet other applications allow users to access information in a way that requires users to leave the screen that they are currently on, or obstructs the information already on the screen. All of these options for displaying information in a mobile device application do not optimize the use of the limited display area available to mobile device applications to display information.

DETAILED DESCRIPTION

Figure 1:
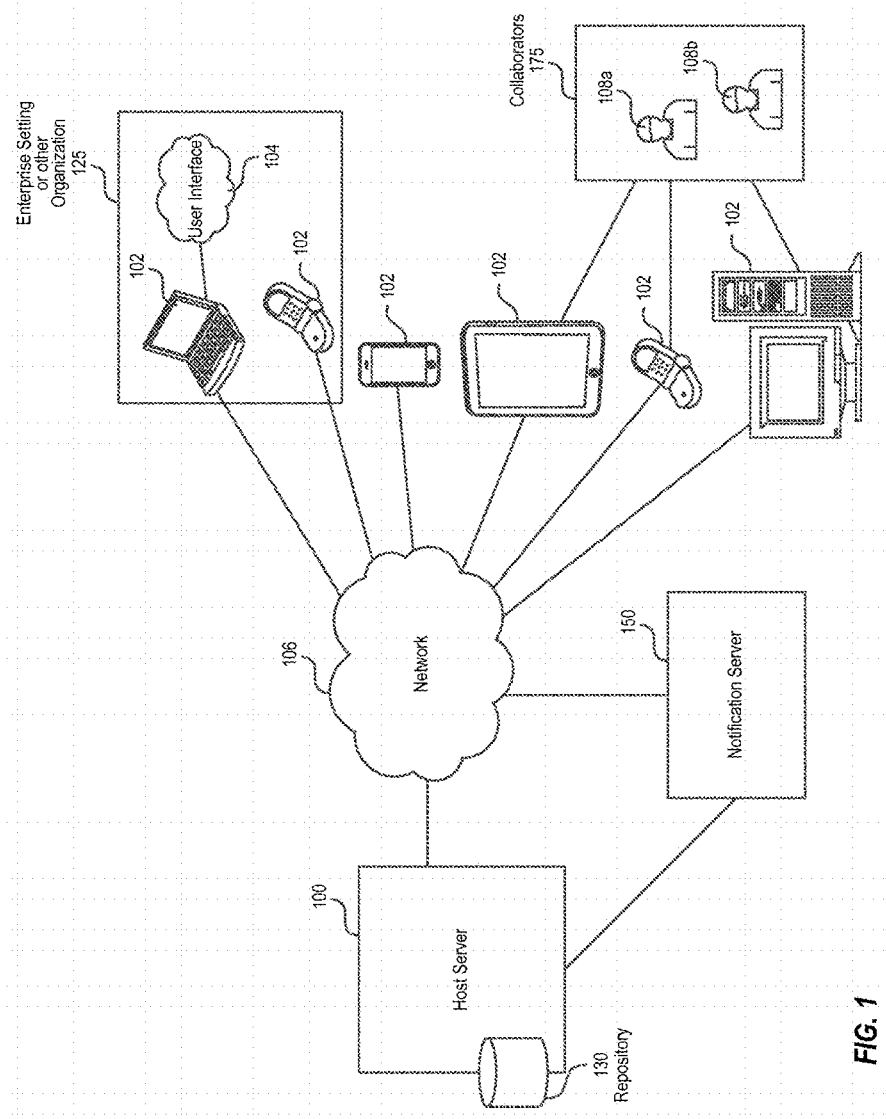
FIG. 1 illustrates an example diagram of a system having a host server of a cloud service and/or cloud storage accounts accessible via an interactive mobile user interface utilizing a manipulative handle.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include system and method of a manipulative handle in an interactive mobile user interface of a cloud-based collaboration platform. The embodiments facilitate generating, displaying, providing and/or using user interface elements such as a manipulative handle for revealing detail or additional information relating to collaboration platform activities such as uploading, downloading, syncing, streaming, emailing, printing, deleting, copying, and/or the like that are supported by the collaboration platform.

It is generally convenient and efficient to have user interface elements such as transfer status user interface element remain visible on screen at all times. However, mobile device user interfaces have limited screen real estate, which makes the task of finding a place for user interface elements such as transfer status difficult. The manipulative handle described herein provides a solution that balances subtlety (keeping the transfer status minimal) while still allowing the user to get to more detailed information if desired. The manipulative handle described herein strikes the balance by keeping some information (e.g., preferred information) visible on the screen, and some information concealed, either partially or wholly, from the screen, but yet easily accessible from the displayed information should the user desire to see it. Furthermore, the manipulative handle is animated, and responds to user interaction by expanding and contracting, such that the screen real estate is not cramped.

In one example embodiment, the user interface element doubles as a traditional status or progress bar. It shows total status of an action in an animated bar, but can also be used as a manipulative handle to expand a hidden drawer of further details. In doing so, the animated bar keeps status information on the screen in a manner that is subtle, while also providing the user an option to get more details. Furthermore, the user does not need to leave the screen to view the details, and the information displayed on the screen is not completely obstructed by the expansion of the status bar.

In one implementation, the user interface element may include a status bar that has transparent, hidden touch or grab points. Users may engage one or more of such grab points by touching and/or sliding the grab points along with the motion of their finger tip, stylus, mouse or any other input device, giving the suggestion that the status bar is movable. Sliding the grab points a long enough way reveals a hidden drawer of more advanced details. The solution is space efficient and utilizes the screen real estate taken by the status bar in novel ways.

In another example embodiment, the user interface element may have an intelligent and/or customizable component that determines and displays additional information that is likely to be more useful to the user. The intelligence for providing customized additional or detail information for display on the user interface element may be based on user-specific or aggregate application usage data and/or behavior.

FIG. 1 illustrates an example diagram of a system having a host server of a cloud service and/or cloud storage accounts accessible via an interactive mobile user interface utilizing a manipulative handle.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
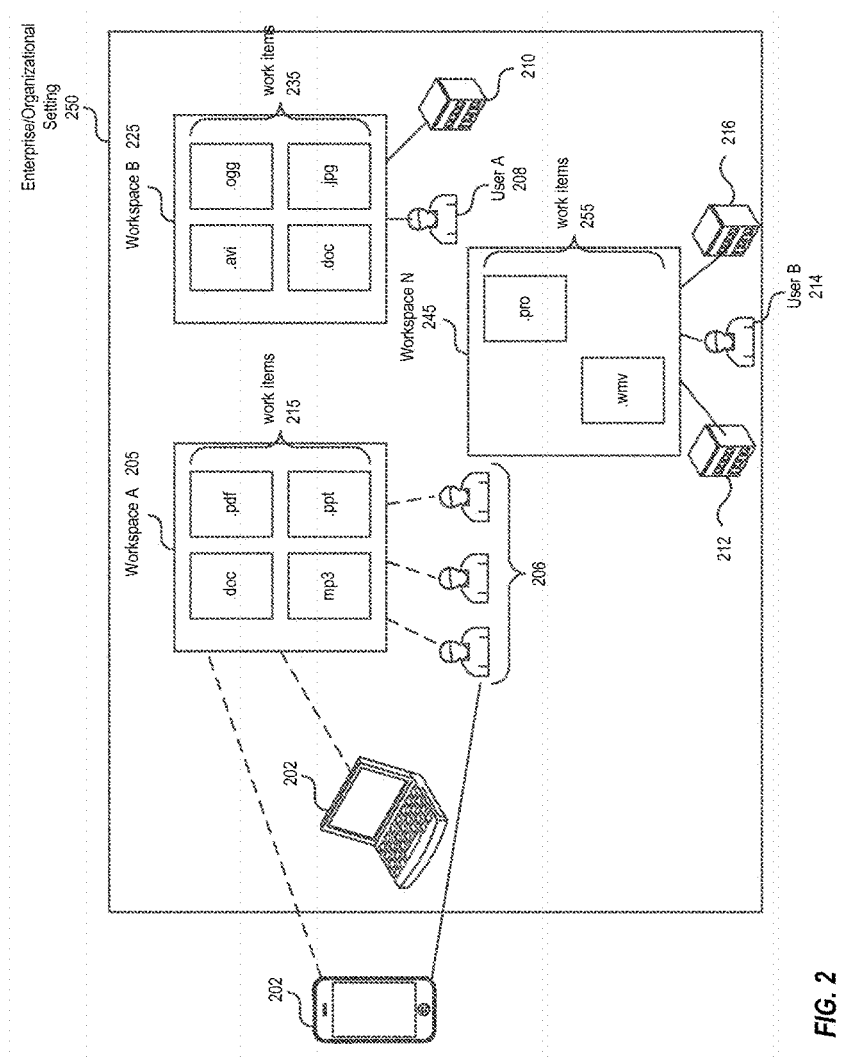
FIG. 2 depicts a diagram of a web-based or online collaboration platform deployed in an enterprise or other organizational setting for organizing work items and workspaces, as one example of a hosted cloud service and/or cloud storage accounts accessible via an interactive mobile user interface utilizing a manipulative handle.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of cloud-based services and/or cloud storage such as an online or web-based collaboration environment is able to track or monitor the devices used by users to access content or activities. In one implementation, such tracking or monitoring may be performed upon receiving explicit permission or authorization from users.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, !MT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service accessible via an interactive mobile user interface utilizing a manipulative handle.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215,235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
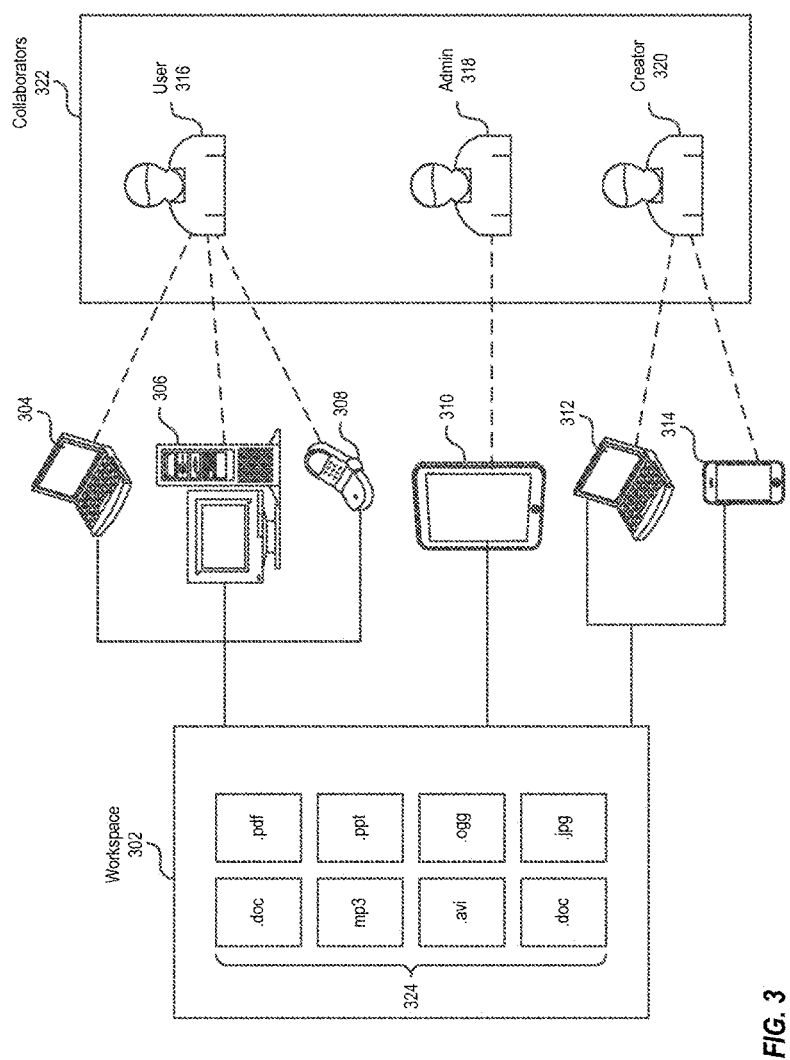
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316,318, and 320 may individually use multiple different devices to access and/or manipulate work items 324 in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Figure 4A:
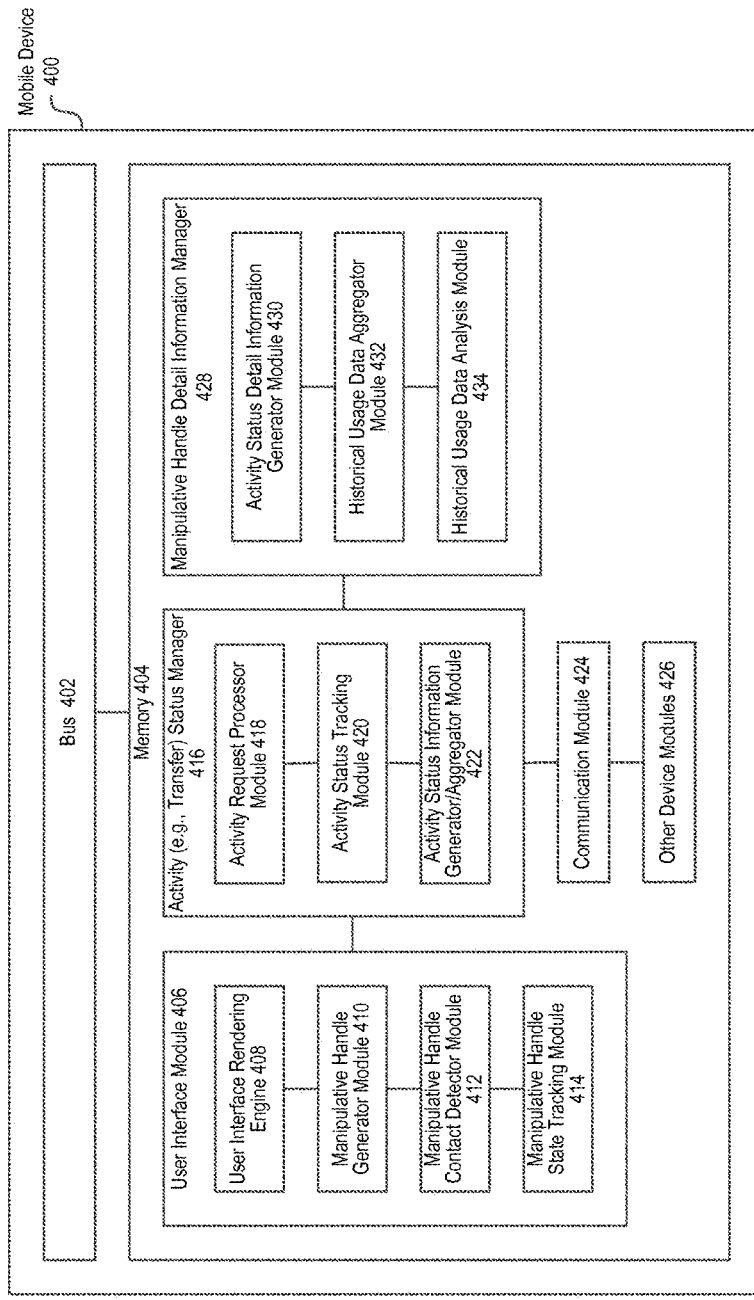
FIG. 4A depicts a block diagram illustrating an example of components in a mobile device with an interactive mobile user interface utilizing a manipulative handle for displaying activity status and associated information.

FIG. 4A depicts a block diagram illustrating an example of components in a mobile device 400 with an interactive mobile user interface utilizing a manipulative handle for displaying activity status and additionally detail information, when the manipulative handle is engaged. The mobile device 400 can be any of the client devices 102 described above. The mobile device 400 can include, for example, a bus 402, and a memory 404 among other components. The memory 404 may include a user interface module 406, an activity status manager 416 and a manipulative handle detail information generator 428. The memory 404 may also include a communication module 424 that facilitates communication between the mobile device 400 and the host server 100 using any of the communication protocols supported by the mobile device 400 and the host server 100. The memory 404 may also include other device modules 426 such as a GPS module for determining and providing location information, text input module for accepting and processing inputs provided using different input mechanisms of the mobile device, and the like for handling various functions of the mobile device 400. Additional or less components/modules/engines can be included in the mobile device 400 and each illustrated component.

The bus 402 is a subsystem for transferring data between the components of the mobile device 400. For example, the bus 402 facilitates the transfer of data between the memory 404 and other components of the mobile device such as the processor and/or the input/output components that utilize the data.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the user interface module 406 may include a user interface rendering engine 408, a manipulative handle generator module 410, a manipulative handle contact detector module 412 and a manipulative handle state tracking module 414. The user interface rendering engine 408 includes program codes that accept data in Extensible Markup Language (XML), JavaScript Object Notation (JSON) or other forms and formatting or style information (e.g., Cascading Style Sheets (CSS)) to display the formatted content on the screen of the mobile device. An example of the rendering engine 408 is the webkit layout engine used in the Android platform. The rendering engine 408 may utilize C/C++ libraries such as SQL lite and graphics libraries such as OpenGL ES to render user interface graphics.

The manipulative handle generator module 410 generates the manipulative handle (e.g., user interface elements 610, 680, 690) illustrated in FIGS. 6A-D. The module 410 may generate the manipulative handle by modifying an existing widget provided by the mobile device platform (e.g., the Android Platform or other mobile operating systems or platforms). For example, the module 410 may modify a progress bar widget to generate a modified progress bar widget that has transparent or hidden grab points that can be engaged by a user. When engaged, the module 410 may further provide an expanded progress bar widget that displays detail information. Alternately, the module 410 can use custom program modules (e.g., new View class in the Android platform) to generate a manipulative handle that can respond to an event, such as an engagement event detected by the manipulative handle contact detector module 412. The module 410 leverages data from other modules such as the manipulative handle state tracking module 414 to determine whether to generate an expanded or minimized manipulative handle, the activity status manager module 416 to obtain data regarding the activity status for display on the manipulative handle, and the manipulative handle detail information generator module 428 to obtain detail information for display on the expanded manipulative handle. Alternately, or in addition to the data provided by the mobile device modules 412, 414, 416 and 428, the manipulative handle generator module 410 may obtain data such as status information, formatted in JSON, WL, or the like, from the host server using the facilities of the communication module 424. The communication module 424 establishes a communication channel such as the Transmission Control Protocol (TCP) connection with the host server.

The manipulative handle contact detector module 412 detects user interaction with the manipulative handle of the user interface. The user interaction may be detected by listening in on a callback made by the mobile device framework. For example, a callback may be made when a touch event occurs. The touch event may be caused when a user taps, slides, releases, or applies another gesture to an engagement area of the touch sensitive screen of the mobile device. The contact detector module 412 may be configured to detect contacts made in a predefined engagement area. The contact detector module 412 may provide information (e.g., Boolean data) regarding the detection event to the manipulative handle generator module 410, which responds by modulating (i.e., expanding or minimizing) the manipulative handle based on the current state (i.e., expanded or minimized state), and providing corresponding data and attributes to the rendering engine 408 for rendering the manipulative handle along with other user interface components on the mobile device.

The manipulative handle state tracking module 414 keeps tracks of the minimized or expanded state of the manipulative handle. The state tracking facilitates the manipulative handle generator module 410 to determine whether to generate an expanded or minimized manipulative handle, when the manipulative handle contact detector module 412 registers a touch event.

The activity status manager 416 provides initial information for display on the manipulative handle in its initial state. The activity status manager 416 further handles activity requests from the user, tracks the processing status of the activity, and generates and/or aggregates information relating to the status for display on the manipulative handle. The activity status manager 416 may include an activity request processor module 418, an activity status tracking module 420 and an activity status information generator module 422. The activity request processor module 418 can receive, detect, process, translate, determine and/or package an activity request into a request message (e.g., an HTTP(S) POST message) that is then sent to the host server 100. The activity request processor module 418 may also receive, process, translate, determine and/or parse activity response from the host server.

By way of a non-limiting example, an activity request can include a transfer request such as an upload or download request. In some instances, upon completion of an upload or download via a mobile device, users or collaborators can be notified in real time or near real time (e.g., via the notification server 150 shown in the example of FIG. 1). An upload request, for example, can be submitted by a user through a user interface of the collaboration platform to upload an item or multiple items individually or in batch; similarly, real time or near real time notification of collaborators or other users can occur from a desktop application, web application and/or on another mobile device upon completion or of other types of status updates.

The activity status tracking module 420 can track the status of an activity by periodically querying the host server or local storage areas of the mobile device 400 to obtain a status of an activity such as a transfer of a file to or from the host server 100. For example, if the activity is an upload/download of a work item to or from the host server of the cloud-based platform, then the activity status tracking module 420 tracks the status of the upload/download by determining the size of the file uploaded or periodically checking storage areas in the mobile device to determine the size of the file downloaded. Other parameters including time and number of files uploaded or downloaded can also be tracked by the activity status information tracking module 420. Example of upload/download status information detected by the activity status tracking module 420 include, but is not limited to: in progress, completed, paused, queued or not started, buffering, and the like.

The activity status information generator module 422 can aggregate, derive and/or generate initial information for display on the manipulative handle in its minimized form. For example, the generator module 422 can obtain upload/download status information from the activity status tracking module 420 and provide such status information to the manipulative handle generator module 410 for display on the manipulative handle. In another example, the generator module 422 can obtain information relating to the size of the file uploaded/downloaded from the host server from the activity status tracking module 420 to determine progress (e.g., percentage complete information) and provide such information to the manipulative handle generator module 410 for display on the manipulative handle (e.g., a status or progress bar).

The manipulative handle detail information manager module 428 aggregates, analyses, generates and/or provides additional or detail information relating to the activity for display on the manipulative handle, when the manipulative handle is activated or engaged by a user. The detail information manager 428 may include an activity status detail information generator module 430, a historical usage data aggregator module 432 and a historical usage data analysis module 434. The detail information manager 428 provides the detail information to the manipulative handle generator module 410 when a detection event is registered by the manipulative handle contact detector module 412.

The activity status detail information generator module 430 can obtain, process and/or generate details relating to the status of the activity. The module 430 may obtain, from the host server, detail activity related information that is generated at the host server. Alternatively, or in addition to obtaining detail information from the host server, the module 430 may obtain activity related information from the activity status tracking module 420. In some instances, the module 430 may process such information locally on the mobile device.

For example, the module 430 may obtain from the activity status tracking module 420, information relating to the status of the upload such as size of the file uploaded to the host server, the total file size, download/upload speed, number of files being downloaded/uploaded, percentage completed, estimated time remaining, and the like. The module 430, in one implementation, may directly query the host server for detail information relating to the activity. For example, the module 430 may request the host server to provide contextual information relating to the file or the upload activity such as location where the file is being saved or can be accessed from in future, information relating to collaborators, and the like. The additional detail query to the host server may include one or more parameters such as activity type, storage location (e.g., folder name), and/or the like. The host server, based on the parameters, can determine and provide detail information for display on the manipulative handle. For example, if the activity is related to an upload of a file to a collaboration folder, the detail information may include information such as collaboration history, names of collaborators, options to add collaborators, and/or the like. In one implementation, when a batch upload or batch download is being performed, the module 430 may obtain and/or generate detail information for each file in the batch upload or batch download. In a further implementation, the detail information may include status information for each file in the batch, options to modify (e.g., cancel, pause, email, print, and the like) each file in the batch, and/or options to modify all the files in the batch.

Historical usage data aggregator module 432 tracks application usage and aggregates the application usage data for further analysis by the historical usage data analysis module 434. Types of application usage data aggregated by module 432 include, but are not limited to: use of options such as print, email, preview, share, comment, annotate, etc., use of features such as collaboration (e.g., user actively collaborates, passively collaborates, or never collaborates), interaction with other collaborators, and/or the like. The historical usage data analysis module 434 can reside at the host server or in the mobile device. When the analysis module 434 is residing at the host server, the historical usage data aggregator module 432 sends the aggregated usage data to the host server for further analysis. The host server may then utilize the results of the analysis (e.g., correlation data) to determine and provide detail information appropriate for the user.

The historical usage data analysis module 434, regardless of where it resides, analyses the aggregated usage data from module 432 to determine additional detail information for display on the manipulative handle when it is engaged by the user. For example, the analysis module 434 may determine, based on the usage data, an option (e.g., print, email, share, preview, and the like) that is most frequently used by the user when performing a given activity, and provide the option for display on the manipulative handle. In another example, the analysis module 434 may determine, based on frequency of collaboration, whether further information on collaboration should be displayed, and if so, provide the further information on collaboration for display on the manipulative handle. Similarly, the analysis module 434 may anticipate based on, for example, frequency of email exchanges with other collaborators, that the user is likely to email a file being downloaded to another collaborator, and provide an option (e.g., a link or a button) to send an email to the collaborator for display on the manipulative handle (e.g., "send email to John Doe" button).

Figure 4B:
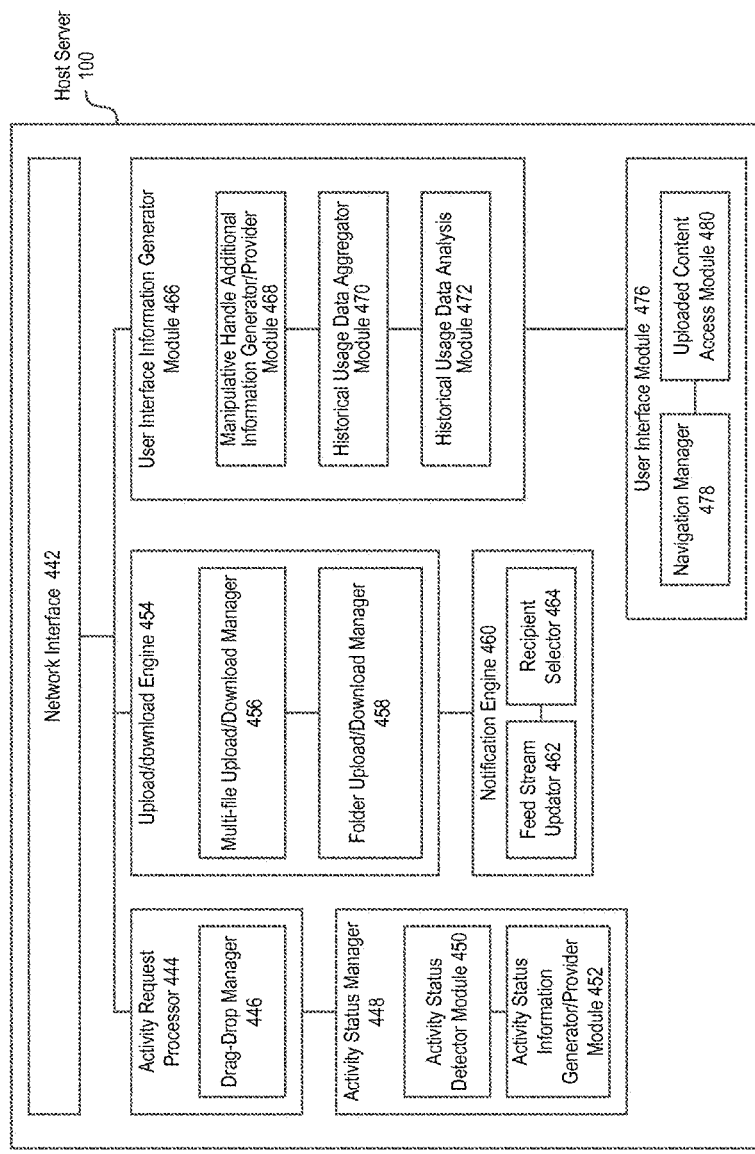
FIG. 4B depicts a block diagram illustrating an example of components in a host server for cloud-based services (e.g., collaborative and/or file sharing) and storage services accessible via an interactive mobile user interface utilizing a manipulative handle.

FIG. 4B depicts a block diagram illustrating an example of components in a host server 100 for cloud-based services and storage accounts accessible via an interactive mobile user interface utilizing a manipulative handle.

The host server 100 of the web-based or online collaboration environment can generally be a cloud-based service. The host server 100 can include, for example, a network interface 442, an activity request processor 444 having a drag-drop manager 446 and an upload/download engine 454 having a multi-file upload/download manager 456 and/or a folder upload/download manager 458. The host server 100 can also include, for example, an activity status manager 448 having an activity status detector module 450 and an activity status information generator/provider module 452, and a user interface information generator module 466 which may include a manipulative handle detail information generator and/or provider module 468, a historical usage data aggregator module 470, and/or a historical usage data analysis module 472. One embodiment of the host server 100 further includes a notification engine 460 having, for example, a feed stream updator 462 and/or a recipient selector 464. Additional or less components/modules/engines can be included in the host server 100 and each illustrated component.

The network interface 442 can be a networking module that enables the host server 100 to mediate data in a network with an entity that is external to the host server 100, through any known and/or convenient communications protocol supported by the host and the external entity. The network interface 442 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

One embodiment of the host server 100 includes the activity request processor 444 which can receive, detect, process, identify, parse, translate, and/or determine an activity request. By way of a non-limiting example, an activity request includes a transfer request such as an upload or download request. An upload/download request can be submitted by a user through a user interface of the collaboration platform to upload/download one or multiple items.

The user can identify the files, content, or work items to be uploaded to the host server 100 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of a user interface. Drag-and-drop activated uploaded requests can be detected, handled, received, processed, and/or otherwise managed by the drag-drop manager 446.

In one embodiment, the upload request is generated via a drag-and-drop action of a single folder which includes the multiple work items to be uploaded to the host server 100. For example, the upload request can be generated when a folder having the multiple items on a client device that is to be uploaded is identified through the user interface. In some instances, the folder can include additional folders in a folder hierarchy of multiple items.

In some instances, the user can generate an upload request by activating the upload feature in a tab on a user interface and initiate uploading by selecting (e.g., clicking on or otherwise activating) a button/tab. Once selected, another user interface or a pop-up window may appear allowing the user to navigate through files or folders to select the items to be uploaded.

Once upload requests have been detected and processed, the upload engine 454 can upload the requested item or multiple requested items. The upload engine 454 can, in one embodiment, upload a single item or multiple items (e.g., sequentially or simultaneously) to the host server 100. A multiple item upload may be initiated via a single-step or multi-step user request. A multi-file upload request can be handled, processed, and executed, for example, through the multi-file upload manager 456.

In one embodiment, the multi-file upload manager 456 receives an identification of each of the multiple files to be uploaded (e.g., from the upload request processor 444) and sequentially prepares each individual file for uploading and uploads each file independently. For example, the upload manager 456 can compress one of the multiple files individually, upload it to the host server 100 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 100. The upload may automatically progress from one file when completed to the next one in sequence when the user initiates a multi-file upload request.

In one embodiment, the upload engine 454 uploads multiple items in a folder hierarchy based on a single request to upload a folder which has a hierarchy of folders inside, for example, via the folder upload manager 458. In one embodiment, the folder upload manager compresses the multiple items in the folder hierarchy in a single process into a single item and uploads the single item in a single upload process (rather than one by one) to the host server 100. After the merged file of multiple items has been uploaded, the folder upload manager 458 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

In one embodiment, the activity status manager 448 detects, tracks and manages status of an activity being processed by the activity request processor 444 and the upload/download engine 454. The activity status manager 448 may also respond to request for information from the corresponding activity status manager 416 of the mobile device 400. The activity status detector module 450 can detect the status of, for example, a request for a single or batch upload of files. By way of non-limiting example only, the detector module 450 detects status such as, but not limited to: upload complete, upload in progress, waiting to upload, file in preprocessing, file in post-processing, file in buffer, file in permanent storage, and the like. The activity status detector module 450 can further detect and track status such as, but not limited to: total size of files(s) to upload, time elapsed, total size of file(s) uploaded, time remaining, average speed of upload, and the like.

The activity status information generator module 452 obtains, processes, generates and/or packages status information on an activity and provides such information to the mobile device. In one implementation, the providing is triggered by events detected by the activity status detector module 450. For example, when the upload of a file is complete as detected by the detector module 450, the module 452 may process and package the status information and send it to the mobile device for display. In another implementation, the providing is triggered by a request for status information from the mobile device. In yet another implementation, the module 452 periodically checks the status information from the detector module 450 and provides such information to the mobile device.

In one embodiment, the host server 100 may include the manipulative handle detail information manager module 466 having the manipulative handle detail information generator module 468, the historical usage data aggregator module 470 and historical usage data analysis module 472. The detail information generator module 468 performs the function of receiving and parsing requests for detail information, gathering and/or generating the requested detail information, and providing such information to the corresponding manager module 428 of the mobile device. The detail information generator module 468 usually obtains detail relating to the activity status from the activity status detector manager 448. In some embodiments, the detail information generator module 468 can obtain detail information from the historical usage data aggregator module 470 and the historical usage data analysis module 472.

Similar to the historical usage data aggregator module 432, module 470 aggregates user-specific application usage data such as, but not limited to: use of options such as print, email, preview, share, comment, annotate, use of features such as collaboration, interaction with other collaborators, and the like. Furthermore, the server-side implementation of the module 470 may aggregate application usage data collected from some or all users, such that the aggregate application usage data represents aggregate application usage behavior of a representative sample of users or all users of the collaboration platform. Module 472, like the historical usage data analysis module 434, analyses aggregated application usage data (e.g., user specific and otherwise) to determine information, options, functions and/or features that are likely to be useful to a user. The analysis module 434 can, in some implementations, establish correlations, such as a correlation between an activity type and information, options, functions or features most frequently used by users performing the activity. The detail information generator module 468 can provide the information, options, functions and/or features determined by the historical usage data analysis module 434 to be the most relevant, applicable, useful or correlated to the mobile device for display on the expanded manipulative handle.

One embodiment of the host server 100 includes a notification engine 460. The notification engine 460, can for example, update a feed stream to include an updated feed indicate that an item or multiple items have been uploaded, for example, via the feed stream updator 462. The users that are notified can be selected, for example, by the recipient selector 464, and can include collaborators or the user, or other users meeting a criterion. In some instances, the feed stream is updated in real time or near real time relative to when the upload of the item completed. For real-time updating, the notification engine 460 can utilize another server, or another engine in the same server which provides push functionality.

The notification engine 460 can generally notify users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment, the notification is depicted through a web-browser used by the other user to access the web-based collaboration environment, for access in real time or near real time to when the activity was performed by the user. When notifying a user in real time through a web-browser, the notification engine 460 can utilize a push-enabled service to ensure real time notification. In one embodiment, the notification is sent by a component or another server which implements push technology (e.g., the notification server 150 shown in the example of FIG. 1). The push-enabled service can be implemented via long poll or HTTP streaming, for example, by the notification server 150 or another component, device which may be internal to or external to the host server 100. In addition, the host server 100 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

One embodiment of the host server 100 includes the user interface module 476, which preserves or enhances user experience before, during, or after an upload request. For example, the user interface module 476 can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 478 in the user interface module 476. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100. Navigation between the pages during an upload of multiple files can also be managed by the navigation manager 478. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 100 available for access through the user interface, even when some of the multiple items have not yet been uploaded to the host server, via the upload content access module 480, for example. Thus, during an active upload, individual files which have completed uploading can be accessed or interacted with by the user in the collaborative environment without having to wait for the full upload to complete.

In some instances, the item which has been uploaded to the host server is manipulatable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

Figure 5:
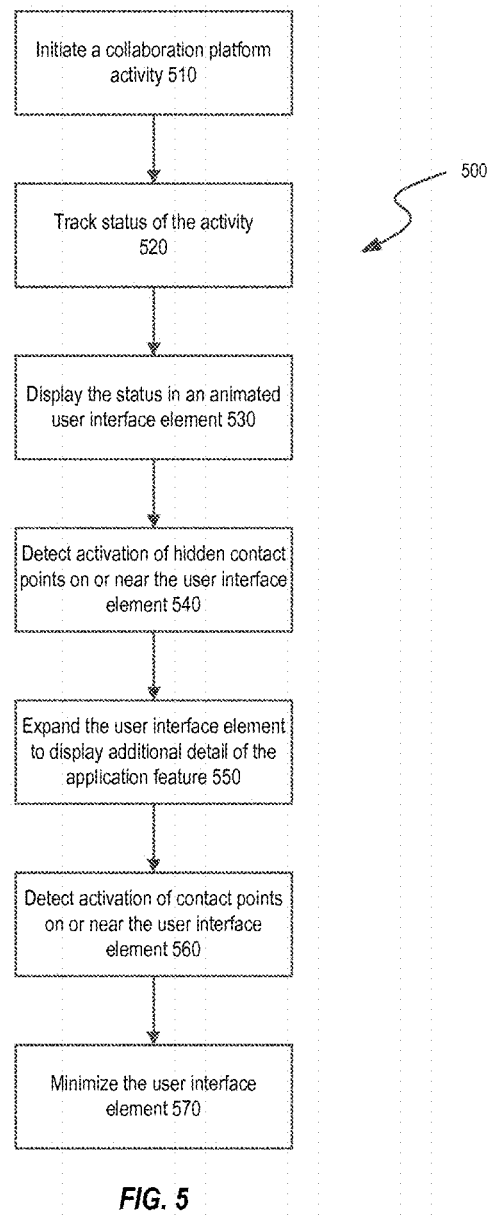
FIG. 5 illustrates a logic flow diagram of an example method for revealing additional detail using an animated user interface element.

FIG. 5 illustrates a logic flow diagram of an example method for revealing additional detail using a user interface element. Example method 500 includes initiating a collaboration platform activity from the mobile device, tracking the status of the activity and displaying the status using a user interface element. Example method 500 further includes detecting activation of hidden grab points on or near the user interface element and expanding the user interface element to reveal additional detail. If the user interface element is already in an expanded state, detecting activation of hidden grab points on the user interface element may cause minimization of the user interface element, thereby concealing the additional detail revealed earlier.

A user may initiate a collaboration platform activity at block 510 by, for example, activating an application feature. An application feature includes any functions provided by the collaboration platform. By way of example only, an application feature includes upload, download, sync, transfer, stream, email, print, comment, post, copy, move, open, close, delete, and/or the like of a work item or multiple work items. Associated with each activity is a status. For example, if the user initiated upload of a file, the status would provide information on the progress of the activity. At block 520, the status of the activity may be tracked. The status may track, for example, any of the previously discussed activity related information such as the percentage or size of the file that has been uploaded and/or is still to be uploaded at any given time, the amount of time passed and/or time remaining to complete the activity, and/or the like.

At block 530, the status may be displayed in an animated user interface element. Referring to user interface 605 shown in FIG. 6A, an animated user interface element may be depicted by a status bar 610. As shown, a download activity is being performed, and status bar 610 shows the status of the download (e.g., download of 672.7 KB of 123.6 KB complete).

Status bar 610 may be an animated status bar. In other words, the status bar is not static, but is responsive to user interaction. In one implementation, status bar 610 and/or an area proximate to the status bar may be responsive to user interaction. The responsiveness to user interaction may be provided by hidden contact, touch or grab points, which may be contacted, touched, or otherwise engaged. Referring to FIG. 5, at block 540, an activation or engagement of such hidden contact points at or near the user interface element (e.g., status bar 610) may be detected. As previously discussed, the manipulative handle contact detector module 414 may detect the engagement in one embodiment.

In one implementation, the contact points may be engaged in one or more ways. For example, referring to FIG. 6B, user interface 615 depicts example mechanics for engaging hidden contact points. In one implementation, contact points may be distributed over an engagement area, such as an area defined by perimeter 620 around status bar 610. Although a rectangular engagement area is shown, areas of other regular (square, circle, oval, hexagonal, etc.) or irregular shapes, and having different measurements (length, width, radii, etc.) are contemplated. Within the engagement area, the client application may be responsive to various gestures to engage the contact points. For example, in one implementation, the user may apply an upwards motion, represented by gesture 625a, on the display screen. In another implementation, a tap or touch represented by 625b may be sufficient. In yet another implementation, a leftward or a rightward slide represented by 625c may be applied. In other implementations, a downward slide represented by 625d may be applied. One or more of these gestures may be combined in a single implementation.

Figures 6A, 6B:
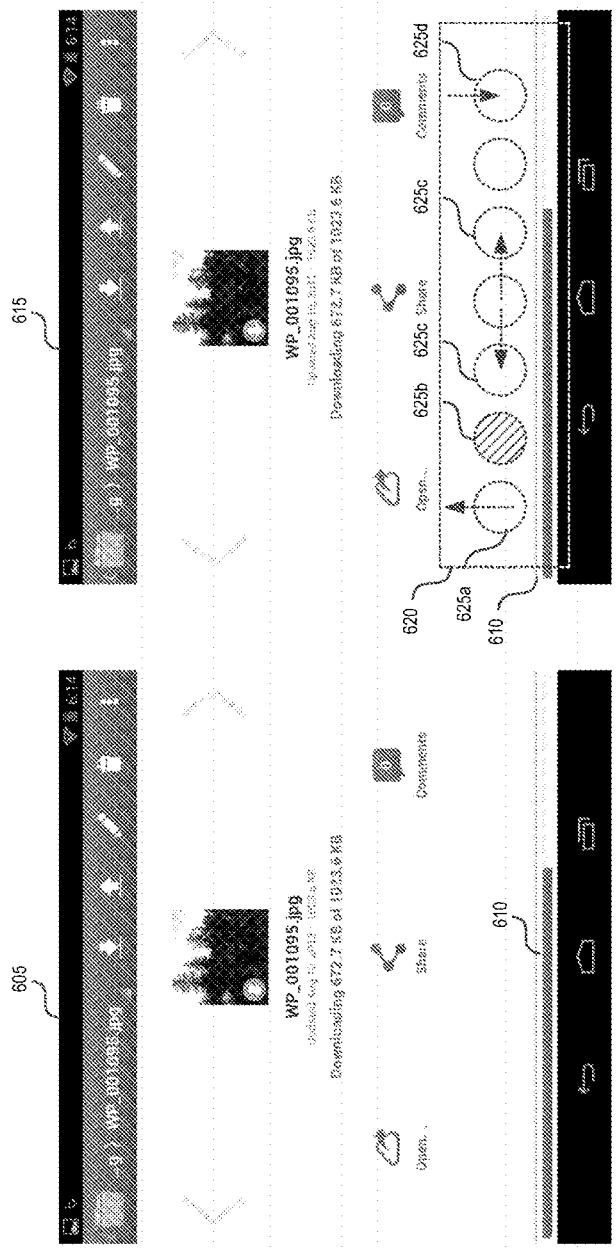
FIG. 6A-E are screenshots showing example user interfaces with animated user interface elements that act as manipulative handles for revealing additional detail.
Figures 6C, 6D:
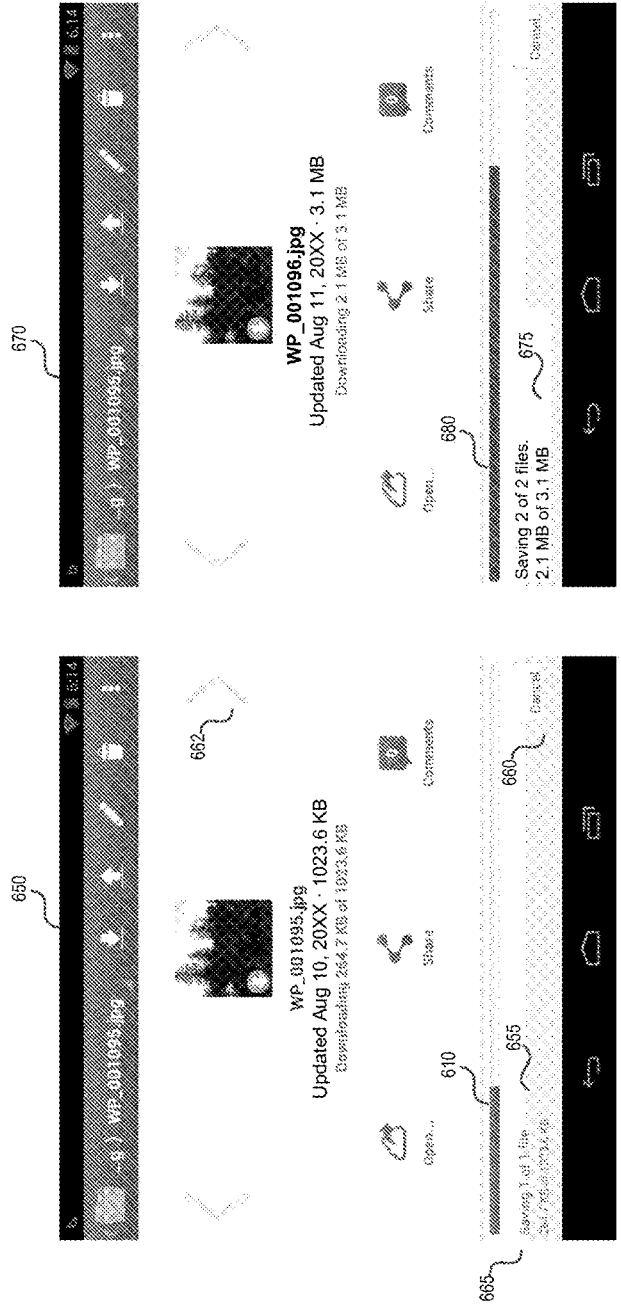
Figure 6E:
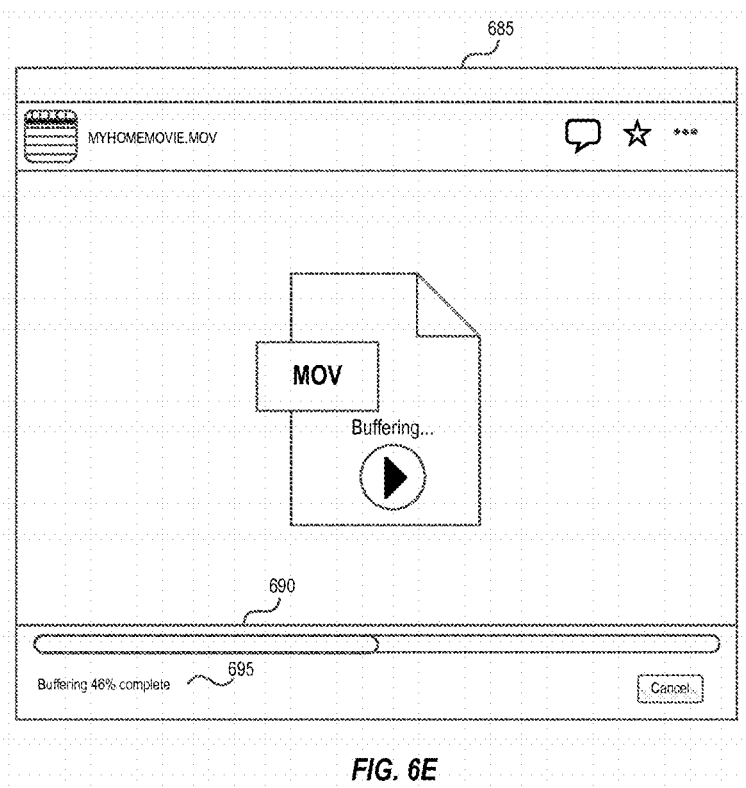

Referring to FIG. 5, upon detection of engagement of the contact points, at block 540, the user interface element may be expanded to display additional detail of the activity. In one embodiment, the expanded user interface element may be generated by the manipulative handle generator module 410, which can leverage data from other mobile device modules and/or the host server 100. Referring to FIG. 6C, user interface 650 shows the expanded user interface element 665. Expanded user interface element 665 includes status bar 610, as well as additional details such as detailed status information represented by 655 and button options represented by cancel button 660. In the example user interface 650, the activity is related to download of a work item and thus, expanded user interface element 665 reveals previously hidden details concerning the status of the download activity, such as the number of files being saved and size of the file downloaded so far, and an option to cancel the activity. In the case of other activities, the expanded user interface element may reveal other previously hidden details. For example, if the activity is upload of a work item, the expanded user interface element may reveal details such as the size of the work item uploaded so far, time remaining to complete the upload, name of the collaboration folder to which the work item is being uploaded, names of users A, B and C who are designated as collaborators, size of the user account used/free, and/or the like. The detail information may be generated and/or provided by the manipulative handle detail information manager 428 and/or the user interface information generator module 466. Referring to FIG. 6E, an example user interface 685 shows an activity relating to playing of a movie file. As shown, the client application may have buffering requirement, where it waits until a certain portion of the file is downloaded in the client device cache memory before playing the file. The user may engage the status bar 690 or an area around the status bar to expand to view details 695 concerning the "buffering" status.

In one implementation, options for modifying the activity or initiating another activity (e.g., email, print, share, etc.) may be available. For example, as previously discussed, the expanded status bar may include an option to modify the download activity by canceling it. Other types of modifications include pause, resume, and/or the like.

In various implementations, the additional detail that may be revealed by the expanded user interface element may vary. In various embodiments, the additional detail information can be generated and/or provided by the manipulative handle detail information manager 428 of the mobile device, the user interface information generator module 466 of the host server, or a combination thereof. In one implementation, the additional detail may include information that may be useful to the user or is likely to be used based on the user's historical usage data and/or a user profile. For example, if the user is an active collaborator, the additional detail may include collaboration information corresponding to the specific activity. Similarly, if the user regularly prints or emails documents, the additional detail may include options to perform print or email action. Such historical usage data may be saved locally or remotely in one or more servers and/or associated data stores.

In another implementation, the additional detail may include information based on predefined criteria such as activity type. For example, if the activity is associated with a file transfer, the additional detail may include file size information, file transfer location, size of file transferred or remaining to be transferred, and/or the like. Similarly, if the activity is associated with an upload to a collaboration folder, the additional detail may include information such as collaboration history, names of collaborators, options to add collaborators, and/or the like. Thus, in some implementations, the expanded drawer of additional details may be used as a pivot point to perform other actions relating to a specific item without having to leave the current screen, and without having the additional information obstruct the original activity (e.g., status of the file download).

Similar to the way the user interface element is used as a handle to expand and reveal additional detail, the expanded user interface element may also be used as a handle to conceal the additional detail and display the user interface element in its minimized original form. Alternately, the expanded user interface element may be modified by removing a portion, but not all of the additional detail, such that a modified user interface element, and not the original form of the user interface element, is displayed. Referring to FIG. 5, the minimization may be initiated when, at block 560, engagement of hidden contact points on or near the expanded user interface element is detected. As previously described, the engagement area may be defined by a perimeter, and one or more gestures may be applied. In response to the detection of engagement of the hidden contact points, the expanded user interface element may be minimized at block 570, thereby again concealing the additional detail.

In one implementation, the minimization of the expanded user interface element may not require engagement of the hidden contact points. The expanded user interface element may be automatically minimized after a predefined amount of time (e.g., 15 seconds) has lapsed. In a further implementation, the timer may be reset when the user engages one or more options on the expanded user interface element.

In one implementation, it should be noted that the engagement of any area outside of the engagement area may have no effect on the state (e.g., expanded or minimized state) of the user interface element. For example, referring to FIG. 6C, when the user selects the scroll option 662 on user interface 650, next user interface 670 of FIG. 6D is displayed. As shown, the state of the status bar user interface element in user interface 670 remains the same (i.e., expanded state). However, the content of the expanded user interface element is changed to reflect the current item being displayed on the display panel (e.g., WP_001096.jpg of user interface 570 instead of WP_001095.jpg of user interface 550).

Figure 7:
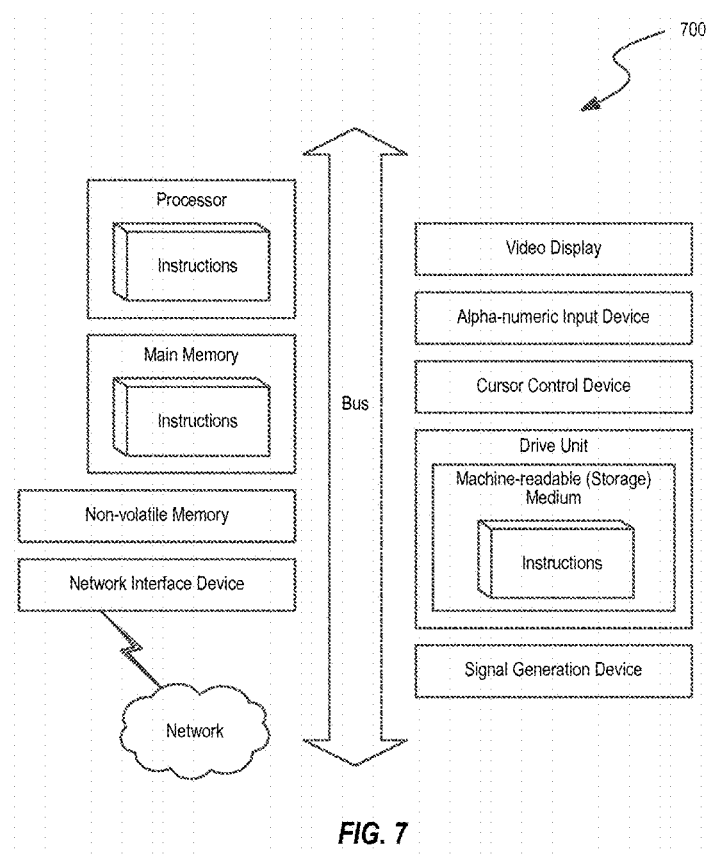
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶[6, other aspects may likewise be embodied as a means-plus-function claim, or in other forms, such as being embodied in a computer-readable medium. (Any claims intended to be treated under 35 U.S.C. § 112, ¶[6 will begin with the words "means for") Accordingly, the applicant reserves the right to add additional claims after filing the application to pursue such additional claim forms for other aspects of the disclosure.

What is claimed is:

1. A method of an interactive user interface for accessing a cloud-based platform via a mobile device, comprising:
    displaying, to a user, first information concerning a multi-file cloud-based platform supported activity on a user interface element of an application on the mobile device, the application providing access to one or more content items in the cloud-based platform and allowing interaction with one or more users of the cloud-based platform, the user interface element configured to provide customized user-specific options selectable by the user based on analyzing data relating to usage of the application on the mobile device, the usage of the application comprising access to the one or more content items or interaction with the one or more users, wherein the multi-file cloud-based platform supported activity includes at least two files;
    detecting engagement of the user interface element or a region defined by a perimeter relative to the user interface element for generating the data relating to the usage of the application on the mobile device, wherein the engagement includes engagement of multiple contact points on the user interface element or the region defined by the perimeter relative to the user interface element;
    upon detecting the engagement of the user interface element or the region defined by the perimeter relative to the user interface element, determining a state of the user interface element, wherein the state of the user interface element includes a fully expanded state or a partially minimized state;
    in response to determining that the user interface element is in a partially minimized state and the cloud-based platform supported activity is associated with a file transfer including the at least two files, changing the partially minimized user interface element to a fully expanded user interface element to reveal information that is concealed in the partially minimized state and is supplemental to the first information; and
    upon identifying that the cloud-based platform supported activity is associated with a file transfer, displaying second information within the fully expanded user interface element.

2. The method of claim 1, wherein, the cloud-based platform provides a collaboration or a file sharing service.

3. The method of claim 1, wherein the engagement includes tapping or sliding of one or more of the multiple contact points via touch screen action on a screen of the mobile device.

4. The method of claim 1, wherein the cloud-based platform supported activity includes a single file and corresponds to download of the file from a host server of the cloud-based platform and the first information includes status information concerning the status of the download.

5. The method of claim 4, wherein the second information includes additional detail relating to the status information concerning the status of the download.

6. The method of claim 5, wherein the second information includes additional detail relating to one or more options to make modifications to the download of the file or initiate a collaboration or a file sharing activity.

7. The method of claim 5, wherein the data relating to usage of the application on the mobile device is specific to a user.

8. The method of claim 1, further comprising:
   detecting engagement of the expanded user interface element or a region defined by a perimeter relative to the expanded user interface element; and
   in response to determining that the user interface element is in an expanded state, minimizing the expanded user interface element such that the second information is not displayed.

9. The method of claim 2, wherein the cloud-based platform supported activity includes collaboration activity with other users in the cloud-based platform.

10. The method of claim 9, wherein, the cloud-based platform supported activity includes at least one of: downloading, syncing, transferring, buffering, copying, deleting, emailing, generating a preview, or commenting on the file.

11. A mobile device having an interactive mobile user interface for accessing a cloud-based service to interact with a work item, comprising:
   a processor configured to:
   detect the engagement of the user interface element or a region defined by the perimeter relative to the user interface element; and
   upon detecting the engagement of the user interface element or the region defined by the perimeter relative to the user interface element, determine a state of a user interface element or the region defined by the perimeter relative to the user interface element, wherein the state of the user interface element includes a fully expanded state or a partially minimized state;
   a memory unit having instructions stored thereon which when executed by the processor, causes the processor to generate the interactive mobile user interface having the user interface element configured to:
   display, to a user, status information concerning a multi-item cloud-based platform supported activity that includes at least two work items, the user interface element including multiple contact points responsive to user engagement;
   changing the partially minimized state user interface element to a fully expanded user interface element to reveal information that is concealed in the partially minimized state and is supplemental to the status information, in response to determining that the user interface element is in the partially minimized state, upon detecting engagement of the user interface element;
   upon identifying that the cloud-based platform supported activity is associated with a work item transfer, displaying additional information within the fully expanded user interface; and
   provide customized user-specific options selectable by the user based on analyzing the data relating to the usage of an application associated with the mobile user interface, the application providing access to one or more content items in the cloud-based platform and allowing interaction with one or more users of the cloud-based platform and the usage of the application comprising access to the one or more content items or interaction with the one or more users.

12. The mobile device of claim 11 wherein, the cloud-based service includes a cloud-based collaboration service, wherein, the at least two work items are transferred to or from the cloud-based service via the mobile device for collaboration on the at least two work items with other users of the cloud-based service.

13. The mobile device of claim 11, wherein the engagement of the user interface element includes tapping or sliding of one or more of the multiple contact points via touch screen action on a screen of the mobile device.

14. The mobile device of claim 11, wherein the additional information includes one or more options to modify the transfer of the at least two work items.

15. The mobile device of claim 11, wherein the additional information is determined based on historical usage data.

16. The mobile device of claim 11, wherein the status information is provided by a host server associated with the cloud-based service and at least some of the additional information is obtained locally from the mobile device.

17. The mobile device of claim 11, wherein the user interface element is further configured to:
   decrease in size in response to detecting a subsequent engagement of the user interface element such that the additional information is not displayed by the user interface element.

18. A non-transitory computer-readable storage medium storing a set of instructions which when executed by a computing system on a mobile device causes the computing system to perform a method for generating an interactive user interface on a mobile display region for providing information related to processing information of a work item of a cloud-based environment, comprising:
   displaying, to a user, status information relating to a multi-item cloud-based environment supported activity associated with at least two work items;
   providing a user interface element for user interaction, wherein the user interface element includes multiple contact points responsive to user interaction, the user interface element configured to provide customized user-specific options selectable by the user based on analyzing data relating to usage of an application on the mobile device, the application providing access to one or more content items in the cloud-based platform and allowing interaction with one or more users of the cloud-based platform and the usage of the application comprising access to the one or more content items or interaction with the one or more users;
   detecting the user interaction with the user interface element for generating the data relating to the usage of the application on the mobile device;
   upon detecting the user interaction, determining a state of the user interface element, wherein the state of the user interface element includes a fully expanded state or a partially minimized state;
   in response to determining that the user interface element is in a partially minimized state and the cloud-based environment supported activity associated with an upload of a work item or a work item transfer session, changing the partially minimized user interface element to a fully expanded user interface element to reveal information that is concealed in the partially minimized state and is supplemental to the status information; and
   upon identifying that the cloud-based environment supported activity is associated with a work item transfer session, displaying additional information within the fully expanded user interface element.

19. The computer-readable storage medium of claim 18, wherein the cloud-based environment supported activity includes performing a batch processing function of work items, including one or more of batch upload, batch download function, to or from the cloud-based collaboration environment.

20. The computer-readable storage medium of claim 19, wherein the batch processing function of the work items is related to collaboration activities with other users of the cloud-based environment such that other users of the cloud-based environment are able to perform collaborative functions on the batch uploaded or the batch downloaded work items.

\* \* \* \* \*